United States Patent [19]

Happel et al.

[11] Patent Number: 4,491,639
[45] Date of Patent: Jan. 1, 1985

[54] METHODS OF MAKING HIGH ACTIVITY TRANSITION METAL CATALYSTS

[75] Inventors: John Happel, Hastings-on-Hudson, N.Y.; Miguel A. Hnatow, Verona; Laimonis Bajars, Princeton Junction, both of N.J.

[73] Assignee: Gas Research Institute, Chicago, Ill.

[21] Appl. No.: 431,192

[22] Filed: Sep. 30, 1982

[51] Int. Cl.³ .................. B01J 27/02; B01J 21/02
[52] U.S. Cl. .................. 502/219; 502/220; 502/221; 502/204
[58] Field of Search .................. 252/432, 439, 436

[56] References Cited

U.S. PATENT DOCUMENTS

| | | | |
|---|---|---|---|
| 2,232,909 | 2/1941 | Gohr | 252/439 X |
| 3,764,649 | 10/1973 | Kurtak et al. | 252/439 X |
| 3,872,028 | 3/1975 | Rynten et al. | 252/439 |
| 4,162,363 | 7/1979 | Stapp | 252/439 X |
| 4,324,645 | 4/1982 | Angevine et al. | 502/219 X |
| 4,328,127 | 5/1982 | Angevine et al. | 502/219 |

*Primary Examiner*—William G. Wright
*Attorney, Agent, or Firm*—Cooper, Dunham, Clark, Griffin & Moran

[57] ABSTRACT

Disclosed is a process which comprises calcining an intimate mixture of elemental sulfur and compounds of the other elements in the following empirical atomic formula and further treating the resulting mass to obtain the new catalyst:

$$XY_aZ_bS_cO_d$$

wherein:
X is a transition element or a mixture thereof selected from the group V, Mo, W;
Y is a stability enhancing element or a mixture thereof selected from the group C, Si, B, Ce, Th, Nb, Zr, Ta, U, where "a" can vary from 0 to 2;
Z is a promoter element or a mixture thereof selected from the group Co, Ni, Fe, where "b" can vary from 0 to 0.1;
S is the element sulfur, where "c" can vary from 1.3 to 6.0;
O is the element oxygen, where "d" can vary from 0 to the upper limit required by stoichiometry.

14 Claims, No Drawings

METHODS OF MAKING HIGH ACTIVITY TRANSITION METAL CATALYSTS

FIELD OF THE INVENTION

The invention relates to catalysts from Group IV, V and VI transition elements and to methods for making such catalysts.

BACKGROUND OF THE INVENTION

Catalysts based on the transition elements find wide application in the processing of hydrocarbon feed stocks. They may be employed in treating feed stocks derived from petroleum sources as well as from other fossil fuels such as coal.

Many hydrodesulfurization and hydrotreatment catalysts contain cobalt and molybdenum deposited on an alumina carrier. Such catalysts have also been employed for methanation, production of hydrocarbons by the Fischer-Tropsch synthesis, denitrogenation, hydroforming, hydrocracking, coal liquefaction and the water gas shift reaction. In some formulations nickel and molybdenum have been used, as well as nickel and tungsten, and in some cases supports containing such materials as silica have been used. Vanadium oxide catalysts supported on various carriers have also been found to be active in promoting the above types of hydrocarbon conversions.

After having been charged into an industrial reactor the catalysts are often activated by a sulfur containing reducing atmosphere, and remain in contact with sulfur and reducing substances throughout their life. However, the various forms of lattice and surface sulfur compounds are not well understood. Usually a considerable proportion of the oxygen bound to the transition metals remains unconverted to sulfide, and it is possible that metal binding to both oxygen and sulfur may be present under working conditions.

The book Weisser and Landa, Sulfide Catalyst—Their Preparation and Application, Pergamon Press, 1973, gives details regarding the preparation of many sulfide catalysts. In addition to catalyst preparation by decomposition of solid material, catalysts of this type have been prepared by impregnation on a carrier and by precipitation. Impregnation is the technique believed most frequently employed, but has the disadvantage that some type of activation is usually needed to convert the catalyst to the desired active form. An additional disadvantage is that the high surface area of the support does not always contribute to the production of a catalyst with a high surface area of active components, since subsequent activation reactions change the nature and aggregation of the starting materials that have been deposited on the support.

The employment of sulfide catalysts, particularly in methanation and the Fischer-Tropsch synthesis, could achieve greater commercial significance if they possessed sufficiently high activity. At present nickel based catalysts are used in methanation, because of their high activity, but they have the disadvantage of extreme sensitivity to poisoning by sulfur compounds that are typically present in synthesis gas. In the case of the Fischer-Tropsch synthesis, iron catalysts are employed because they are inexpensive, though their activity and selectivity for producing hydrocarbons in the gasoline boiling range are not high. Consequently, considerable effort has been devoted to the synthesis of new catalysts such as those based on the transition metal sulfides.

Proposals which have recently received considerable attention for the preparation of molybdenum and tungsten sulfide catalysts involve the decomposition of thiosalts. The necessary thiosalts can be prepared by precipitation from ammonium salts of the acids of molybdenum and tungsten by hydrogen sulfide. The resulting thiosalts are then decomposed in the presence of hydrogen or of an inert atmosphere. Details of such proposals are given in Kurtok et al. U.S. Pat. Nos. 3,764,649 and 3,876,755 and in Naumann et al. U.S. Pat. Nos. 4,243,553 and 4,243,554. Molybdenum trisulfide is said to be an intermediate in the formation of the molybdenum disulfide catalyst prepared by this procedure, and methods have been discussed in the literature for alternative preparation starting with the trisulfide. For example, see Furimsky and Amberg, Can.J. Chem 53, 3567 (1975), for a recent survey.

Generally in preparing these catalysts it is desirable to heat the thiosalt or trisulfide to a temperature in the range of 400°–500° C. This essentially converts the precursors to a high surface area molybdenum disulfide $MoS_2$, since above 335° C. the trisulfide begins to decompose to the disulfide and between 350° and 400° C. an exotherm occurs which is thought to be due to the combined effect of the decomposition of the trisulfide, volatilization of sulfur and recrystallization of the amorphous disulfide (according to results reported by Prasad et al, J. Inorg. Nucl. Chem 35, 1895 (1973)). Thus, the procedure proposed by Naumann and others for the preparation of catalyst is said to lead to the production of molybdenum disulfide whose activity is enhanced by the high surface area material obtained (50–150 sq.m/g). The formation of $MoS_2$ in this manner has been reported to be irreversible, and the ratio of molybdenum to sulfur is said to be very close to that required by stoichiometry. See, for example, Busetto et al., Bull. Soc. Chim. Belg. 90 1233 (1981) for recent studies.

Even when the catalyst composition corresponds to an atomic ratio of $Mo/S = \frac{1}{2}$, enhanced activity of catalysts prepared from molybdenum trisulfide has been reported due to the incorporation of hydrogen in the structure in the course of preparation. See, for example, Blake et al., Proc. 7th Int'l Congress on Catalysis, Elsevier, 1981.

Other studies reported by Chianelli, et al., Science 203, 1106 (1979) indicate considerable complexity exists in the case of $MoS_2$ structures that can be prepared in the form of highly folded and disordered S-Mo-S layers.

It therefore appears that much remains unknown about the optimum active forms of transition metal sulfides and the optimum methods for their preparation. The activities of these materials is still reported to be much lower than that of the Group VIII metals commonly used for similar reactions.

Another important property of the transition metal sulfide catalysts insofar as CO hydrogenation is concerned is their high selectivity for $CO_2$ formation. In the case of methanation over nickel catalysts, for example, the process proceeds mainly according to the reaction:

$$3H_2 + CO = CH_4 + H_2O \tag{1}$$

But in the case of transition metal sulfides, the following methanation reaction predominates:

$$2CO + 2H_2 = CH_4 + CO_2 \tag{2}$$

This constitutes a substantial advantage for the case of transition metal sulfide catalysts because it is not necessary, as in the case of nickel, to first produce hydrogen by the water gas shift reaction which requires large amounts of steam:

$$H_2O + CO = H_2 + CO_2 \qquad (3)$$

The hydrogen then is consumed with these catalysts to produce steam again, resulting in an expensive cycling of steam.

There is thus considerable incentive to find a way to enhance the activity of transition metal sulfide catalysts as compared to, for example, Group VIII metals catalyst, while retaining other, desirable properties of the transition metal sulfide catalysts.

OBJECTS OF THE INVENTION

Accordingly, it is an object of the invention to provide for preparing a catalyst based on transition metal sulfides with enhanced activity and other desirable properties.

Another object is to produce a high surface area catalyst in which the active area is obtained directly rather than by impregnation of active materials on a high surface area support.

Another object is to employ a procedure whereby mixed transition and other metals can be readily incorporated into the catalyst material in finely divided form conducive to chemical interaction with feed components.

Further objectives will be apparent from the detailed description below.

SUMMARY OF THE INVENTION

In accordance with the present invention, we obtain the above desired objects by admixing elemental sulfur with a catalyst metal compound—most preferably a molybdenum, tungsten, vanadium, or niobium compound mixed with a zirconium, cerium, uranium or thorium compound, heating said mixture in a non-oxidizing atmosphere to a temperature of 400°–500° C. and further heating in a reducing atmosphere to activate the catalyst. The resultant product is cooled in a stream of non-reactive gas and may be passivated with a stream of gas containing a small proportion of oxygen or steam.

For convenience in handling the solidified mass is preferably broken up into small pieces, or ground and pelletized.

DESCRIPTION OF PREFERRED EMBODIMENTS

The invention follows our surprising discovery that the process described below which involves treatment of $MoS_2$ and other molybdenum compounds with elemental sulfur, followed by its removal as $H_2S$ by reduction, results in strikingly enhanced catalytic activity.

It is believed that $MoS_2$ cannot be converted to $MoS_3$ by reaction with sulfur, as is reported by studies of Moh, Topics in Current Chemistry—76, Springer-Verlag, N.Y. (1978). Nonstoichiometric $MoS_{2+x}$ compositions can be produced by decomposition of $MoS_3$ originally prepared from the thiosalts as discussed above, but the reversal to produce such compounds from $MoS_2$ does not appear to occur. Therefore, the enhanced activity of the invented catalyst seems to reside in a change in structure of the $MoS_2$ itself, perhaps due to disordered forms as suggested by the article by Chianelli, et al. referenced above. Similar, strikingly enhanced catalytic activity, results after similar treatment of compounds of other transition metals, such as vanadium and tungsten. Additional benefits flow from the addition of materials believed to act as stabilizers, and of materials believed to act as promoters.

Catalysts are often sulfided by exposing them to a gaseous mixture containing hydrogen sulfide or other sulfur compounds, such as carbon bisulfide $CS_2$ or carbonyl sulfide COS. Generally, in such cases relatively small amounts of sulfur are incorporated into the catalyst. Gases that are normally used for feed stocks can contain up to 1–2% vol. of hydrogen sulfide and other sulfur compounds, and the presence of such materials can enhance catalyst activity as well as prevent catalyst deterioration in use. In the practice of our invention, however, much larger quantities of sulfur are employed than are required for conversion of oxide precursor compounds to sulfides. In fact initial starting materials are often sulfides, and their stoichiometric chemical composition does not appear to change during the course of activation by our procedure.

In a nonlimiting example of our invention, the new catalyst is made by a process which includes calcining an intimate mixture of elemental sulfur with one or more of the salts of one or more transition metals as well as, optionally, one or more compounds or elements which are believed to enhance stability and one or more compounds or elements which are believed to serve as promoters. The catalyst can contain oxygen up to the upper limit required by stoichiometry.

The transition metals suitable for the new catalyst include, but are not limited to, vanadium, molybdenum and tungsten. The suitable stability enhancing elements include, but are not limited to, carbon, silicon, boron, cerium, thorium, uranium, niobium zirconium and tantalum. The suitable promoter elements include, but are not limited to, cobalt, nickel and iron.

As one nonlimiting specific example, commercially available molybdenum disulfide is mixed with 20–60 wt.% of commercially available flowers of sulfur, and the mixture is blended in a slurry with a suitable wetting agent such as water. The dried and finely ground mixed material is then pelleted and crushed to particles of up to ¼″ in size, preferably 30–60 mesh. The particles are charged to a calcining furnace and heated for a period of time between about 15 minutes and three hours, preferably about one-half hour, by means of a stream of nitrogen, or directly without addition of nitrogen, to the desired reduction temperature, which is in the range of about 400°–700° C. and is preferably in the range of about 450°–500° C. When the desired reduction temperature is reached, the stream of nitrogen fed to the furnace is replaced by a stream of hydrogen-containing gas, preferably hydrogen containing hydrogen sulfide, to prevent over-reduction of the metallic salt or salts. The hydrogen sulfide content of the reducing gas fed to the furnace varies between 0.1 vol. % to 50 vol. %. Usually 1 vol. % to 10 vol. % is preferable. Flow of this reducing gas is maintained until the hydrogen sulfide content of the effluent from the furnace is essentially equal to that of the feed gas. Usually at the beginning the effluent gases contain a large concentration of hydrogen sulfide which falls rapidly after a period of one to two hours. At the beginning of the reduction operation it is often noted that the bed temperature will rise as much as 50° C.

Alternatively the bed may be rapidly heated by hydrogen over a period of about 5-30 minutes, preferably for about 15 minutes. If this heating in the presence of hydrogen is not conducted sufficiently rapidly, reduction of the catalyst mass may occur too slowly, resulting in a lower activity catalyst. However, care must be exercised in passing nitrogen over the catalyst during the preliminary heating period, because sulfur is volatile at the desired reduction temperature of 450°-550° C. and may be removed by evaporation rather than the desirable removal by reduction. The amount of nitrogen passed through the bed during heating should not remove more than about 5-50% of the total sulfur admixed with the original charge, preferably no more than about 10-20%. Sulfur removal can be monitored by the analysis of the effluent for hydrogen sulfide during the reduction procedure.

Following reduction, which involves considerable shrinkage, the catalyst mass is cooled in the presence of reducing gas. It can be desirable to passivate it before exposure to the atmosphere. This can be accomplished by passing a dilute mixture of oxygen and/or water in nitrogen over the catalyst until no appreciable temperature rise in the catalyst bed is noted. If this is not done, some catalysts prepared as described above, especially those containing vanadium, can be highly pyrophoric and glow when removed from the reduction reactor. This rise in temperature is typically undesirable, as it results in both the destruction of the desirable active state of the catalyst and in loss of surface area due to sintering.

After the catalyst is removed from the reduction chamber it is powdered and then compressed to produce granules or pellets for use in appropriate catalytic processes.

Instead of, or in addition to molybdenum disulfide, other molybdenum salts and/or one or more of the salts of one or more other transition metals, such as vanadium and tungsten, can be added to the slurry used in the above process. In addition to said transition metals, one or more of said stability enhancing compounds or elements can be added to the same slurry. Still in addition, one or more of said promoter compounds or elements can be added to the same slurry. The silicon can be in the form of silica gel. Other forms of sulfur can be employed, such as that produced by the acidification of ammonium sulfide. Mixing can also be accomplished by addition of a solution of sulfur in carbon bisulfide. The carbon bisulfide can be subsequently removed either by distillation or phase separation by admixture with a liquid that does not dissolve sulfur, such as acetone. Generally, from 1-99 wt.% sulfur is mixed with the metal salts, preferably 20-60 wt.%. Another method of securing intimate mixture with sulfur comprises adding the salts to molten sulfur or to a mixture of molten sulfur and amonium thiocyanate, in a process similar to that described in our U.S. Pat. No. 4,320,030, which is hereby incorporated by reference. The excess molten material is boiled off, leaving a solid mass which can be calcined directly or after being first crushed and ground.

In order to establish the benefits of the new catalyst formations as compared to prior art sulfide catalysts, a series of experiments was conducted in which sulfur was added in accordance with our invention to various metal salt precursors. The resulting catalyst was evaluated using a mixture of CO and hydrogen-containing gases blended to resemble a typical synthesis gas produced by coal gasification. For the high space velocities employed in these cases, the primary product is methane. With other operating conditions and different feedstocks, additional products such as ethane, propane and higher hydrocarbons are typically produced. The object of this study was to evaluate the effect of catalyst preparation in accordance with our invention on the catalytic properties by means of a typical reaction, rather than to investigate details of other processes.

Details of some experiments performed are given in Examples 1-5 and are discussed here to exhibit the fact that suitable catalysts can be prepared in accordance with our invention from a wide variety of source materials. Results are summarized in Table 1. In Example 1 (used as a basis for comparison) the starting material was a commercial molybdenum sulfide $MoS_2$ furnished by Alfa Products. No sulfur was added but the material was processed using the usual reduction procedure with a gas containing $H_2S$ for reduction at 500° C. to avoid reduction of the sulfide to metallic molybdenum. The maximum conversion of CO in the feed gas was 6.2%. In Example 2, the same commercial molybdenum sulfide material was mixed with molten sulfur and calcined and reduced in accordance with our invention. Example 2 shows a substantially higher conversion of 34.0% of the feed CO. This experiment is important because it demonstrates that sulfur somehow changes the sulfide to produce dramatically enhanced catalytic activity.

Example 3, also employing molten sulfur, but with ammonium heptamolybdate $(NH_4)_6Mo_7O_{24}$ added to it and processed in accordance with our invention, showed a substantially improved activity of 72% conversion of carbon monoxide. In this case the sulfur probably reacted with the molybdenum salt.

In order to determine whether the presence of an oxygen containing salt was crucial to catalyst preparation a test was conducted, Example 4, in which molten sulfur was admixed with molybdenum pentachloride $MoCl_5$ and processed in accordance with our invention to produce a catalyst. The activity was found to be good, corresponding to 61.0% conversion of carbon monoxide. It is possible that the working catalyst after use contains bonded oxygen in its structure since the synthesis gas, of course, contains oxygen.

In Example 5 both $MoCl_5$ and $ZrCl_4$ were mixed with molten sulfur to make a catalyst in accordance with our invention. A conversion of 65.7% of inlet CO was obtained, indicating that even though Zr can be added in the form of other salts, the presence of initial oxide does not seem to be critical.

TABLE 1

| MOLTEN SULFUR CATALYST FORMULATIONS | | |
|---|---|---|
| Example No. | Catalyst Source | Conv. of CO, % |
| 1 | Commercial $MoS_2$ | 6.2 |
| 2 | Commercial $MoS_2$ + S | 34.0 |
| 3 | $(NH_4)_6Mo_7O_{24}$ + S | 72.0 |
| 4 | $MoCl_5$ + S | 61.0 |
| 5 | $MoCl_5$ + $ZrCl_4$ + S | 65.7 |

Since sulfur melts at 112° C. and boils at 445° C., the calcining and reduction steps probably take place in the presence of molten sulfur. Whether the sulfur is originally molten or not, the same final product should be obtainable under suitable operating conditions. Of course, if unreactive metal salts are used as starting materials, it should require more time to complete the desired reactions. From a practical standpoint, it can be desirable to employ a mixture of solid materials.

For this purpose suitable precursor compounds for the preparation of molybdenum sulfide catalysts include the thiosalts of molybdenum and molybdenum trisulfide. A methanation catalyst described by Naumann in U.S. Pat. No. 4,243,554, for example, was made by decomposition of ammonium thiomolybdate. We have found that methanation catalysts with essentially the same activity can also be prepared by the procedure described by the Furimsky and Amberg article referenced above. This procedure involves the precipitation of molybdenum trisulfide by acidification of an aqueous solution of ammonium thiomolybdate and subsequent decomposition of the trisulfide.

Table 2 gives a series of tests to further show the applicability of the new sulfur addition technique in preparing high activity catalysts. The conversion listed for Example 6 gives the results under the test conditions that we employ for evaluation of the molybdenum sulfide catalyst prepared essentially according to the Furimsky and Amberg procedure. A conversion of 50% of the CO in the feed was obtained; 63% of the converted CO appeared as methane in the product gas effluent.

Example 7 gives results from catalyst prepared by direct decomposition of ammonium thiomolybdate following essentially Naumann's procedure. In this case under our standard test conditions (see examples 1–5) a conversion of 62% of the CO in the feed was obtained and 66% of the converted CO appeared as methane in the product effluent.

In example 8 a catalyst was prepared by coprecipitation by acidification of a solution containing zirconium nitrate and ammonium thiomolybdate. Using our standard test procedure this catalyst gave 56% conversion of CO with 58% of the converted CO going to methane.

In all these three cases no sulfur was added to the material before calcination and reduction. Results obtained were comparable. A series of runs shown in the same table, gives results obtained upon addition of sulfur to the formulations in accordance with our invention.

In Example 9 a catalyst was prepared by decomposition of $MoS_3$, similar to Example 6, but with the addition of solid flowers of sulfur before heating and reduction. In this case under our standard test conditions a conversion of 69% of CO in the feed gas was obtained with 59% of the converted CO appearing as methane in the product.

In Example 10 a catalyst was prepared by decomposing $(NH_4)_2MoS_4$ in the presence of a large excess of molten sulfur before reduction. In this case a conversion of 77.5% of the CO was obtained under standard test conditions, with 61% of the CO converted appearing as methane in the product.

In Example 11 solid sulfur was mixed with a zirconium-molybdenum coprecipitate obtained by acidification from a thiomolybdate solution. A conversion of 78% of the CO in the feed was obtained, and 55% of the CO in the feed appeared as methane in the product.

These last three runs in Table 2 show the dramatic improvement obtained by the addition of sulfur to the catalyst formulation before reduction.

TABLE 2
COMPARISON OF MOLYBDENUM SULFIDE CATALYSTS

| Example No. | Catalyst Source | Conv. of CO, % |
|---|---|---|
| 6 | $MoS_3$ | 50 |
| 7 | $(NH_4)_2MoS_4$ | 62 |
| 8 | Mo/Zr, coprecipitate | 56 |
| 9 | $MoS_3$ + solid S | 69 |
| 10 | $(NH_4)_2MoS_4$ + molten S | 77.5 |
| 11 | Mo/Zr coprecipitate + solid S | 78 |

Additional tests were performed to determine the effect of addition of zirconium to the catalyst formulation on its long time performance. Decomposition and reaction takes place in the presence of excess elemental sulfur. In Example 12 a coprecipitate of zirconium and molybdenum was mixed with elemental sulfur to produce a catalyst according to our invention. It should be noted that while the other conditions for testing the catalyst in Example 12 were the same as in examples reported in Table 2, the temperature was raised considerably in the test of Example 12 to about 700° C. in order to accelerate the effect of catalyst use. The zirconium containing catalyst exhibits much greater activity at longer time as well as showing high initial activity. Note that 700° C. is very substantially higher than projected operating temperatures, in present process designs. We believe that it would be impossible to use conventional nickel catalysts under these conditions without extreme problems with sintering.

Experiments were also conducted using ratios of Mo/Zr other than the atomic ratio of 2/1 employed as in Example 11. It has been found possible to secure good activity with Mo/Zr between the ratios of 100/1 and 1/100. Generally for best performance a ratio between 4/1 and 1/2 is suitable. Zr alone exhibits some methanation activity when used to prepare catalysts by the procedure of this invention. In the use of materials like zirconium, smaller proportions are generally employed than when they are used as supports on which active catalysts components are dispersed. When used as supports, such materials as $ZrO_2$ are employed in larger proportions as compared to incorporating them as nitrates into the catalyst structure before reaction with sulfur as in our invention. We therefore prefer to describe such materials as "stability enhancers" rather than use the more restricted term "supports". In the case of zirconium, niobium and tantalum, which are very close in chemical properties to vanadium, molybdenum and tungsten, it is possible to form crystalline $MS_3$ structures according to Liang, et al., J. Non-Crystalline Solids 42, 345 (1980). It is only believed possible to form amorphous $MoS_3$ and $WS_3$, so we believe it is likely that the role of Zr and other closely related transition elements in improving stability is more than that of an inert support, especially if these materials are used in the form of active salts like nitrates instead of in the refractory oxide form.

Other transition elements also exhibit high methanation activity, especially vanadium and tungsten catalysts, when prepared by the procedure in accordance with our invention described here. Results are in most cases superior to those obtained in accordance with our U.S. Pat. No. 4,320,030 which describes the use of ammonium thiocyanate in preparation of high activity catalysts. It is possible to employ ammonium thiocyanate in formulations using elemental sulfur according to the present invention.

The other elements of groups IVA, VA and VIA (in addition to vanadium, tungsten and molybdenum) are also especially useful in enhancement of the catalyst stability, as well as are the elements silicon, boron and carbon, which can be added in concentrations up to equimolar amounts of the essential transition element. Similarly, up to equimolar proportion of cobalt, nickel, iron or manganese can be added as promoters. The sulfur content of the final catalyst can vary from an atomic ratio to the V, Mo, W content of the catalyst of 1.3 to 6.0, depending on how completely sulfur is removed in the reduction process. Oxygen can vary from none up to the upper limit required by the stoichiometry of the system.

The fresh catalyst can be represented by the empirical atomic formula $XY_aZ_bS_cO_d$, wherein X is a transition element or a mixture of the elements selected from the group V, Mo, W; Y is a stability enhancing element or a mixture of the elements selected from the group Th, U, C, Si, B, Ce, Nb, Zr, Ta, where "a" can vary from 0 to 2, and preferably from 0 to 1; Z is a promoter element or mixture of the elements selected from the group Co, Ni, Fe, where "b" can vary from 0 to 0.1; S is the element sulfur, where "c" can vary from 1.3 to 6.0; and O is the element oxygen, where "d" can vary from zero to the upper limit required by stoichiometry.

The nonlimiting examples of our invention given here can be multiplied without departing from the scope of the invention, which is only limited by the scope of our claims.

Other studies have shown the desirable hydrodesulfurization and hydrodenitrogenation activities of the transition metal sulfides disclosed in this invention, particularly when employed in nickel or cobalt promoted form. As in the case of zirconium, it is often convenient to admix the nickel or cobalt nitrate with the thiomolybdate or heptamolybdate salts and with sulfur as the first step in the catalyst preparation procedure.

When operated at lower space velocities (e.g., in the range of about 100 to 500 VV/hr.) reduced temperatures (e.g., in the range of 300° to 400° C.), and higher pressures (e.g., in the range of 500–2000 psig), catalysts prepared in accordance with our invention are useful for the production of low molecular weight hydrocarbons in the gasoline and liquid petroleum gas (LPG) boiling range and low molecular weight hydrocarbon. This type of operation will probably become increasingly important as more reliance is placed on coal as a source of hydrocarbon raw materials. We believe that transition metal sulfide catalysts of the type described here and prepared in accordance with our invention will be applicable in an increasing spectrum of energy related requirements for industrial reactions.

SPECIFIC EXAMPLES OF THE INVENTION

EXAMPLE 1

The $MoS_2$ used in this example was supplied by Alfa Products, a division of Thiokol/Ventron Corporation, and designated catalogue #65102. A 64-gram sample of this commercial material was prepared for reduction by compressing this material into pellets in a Carver laboratory press. These pellets were then broken and sieved into a size of 6–8 mesh. This mass was then charged to a reactor for reduction. The reaction took place in a Vycor glass tube, about 1 inch in diameter and about 30 inches long, heated by a three zone tubular furnace. The system was rapidly heated to 450° C. with a stream of nitrogen flowing at a rate of 800 cc/min. When the temperature reached 450° C., the nitrogen gas flow was switched to a stream of hydrogen containing 2,500 pm $H_2S$ at the same volumetric flow rate, and the reactor was permitted to react at a temperature around 500° C. The temperature was maintained around 500° C. for a period of three hours. The reactor was then cooled by passing a stream of nitrogen through the reactor. The material was removed from the reactor and prepared for evaluation. The reduced material was powdered and sieved to a size of 30–60 mesh material. The fine, reduced material was then compressed into pellets in a Carver laboratory press. The pellets were then broken and sieved to a size between 6 and 8 mesh. Five (5) cc of this material was then used to charge the catalyst evaluation reactor.

A methanation reaction was conducted by passing a mixture of reactant gases upward through a fixed-bed reactor comprising a stainless steel tube, 1 inch in diameter and 14 inches in length. The feed gas mixture was preheated by a resistance heater surrounding the tube. Two additional resistance heaters were used to control the temperature in the reactor. Pressure was controlled by a back pressure regulator on the exit stream. Effluent gases were analyzed in a Perkin Elmer Model 900 Gas Chromatograph, equipped with a temperature programmer. Components analyzed included CO, $Co_2$, $CH_4$, $H_2O$, $H_2$, and $C_2$ and $C_3$ hydrocarbons.

Gas was passed into the reactor at a rate of 4800 v/v/hr (NTP). Feed gas composition corresponded to the following:

|        | Vol. % |
|--------|--------|
| $H_2$  | 48.9   |
| CO     | 35.1   |
| $CH_4$ | 15.0   |

In addition, the feed contained 2500 ppm $H_2S$ to maintain the catalyst in the sulfided state. The $CH_4$ is added to avoid sudden rise in temperature of the catalyst. It acts as a diluent to partially absorb heat produced by the highly exothermic methanation reaction.

At a temperature of 530° C. and reactor pressure of 200 psig the maximum conversion of CO in the feed gas was 6.2%. Approximately 55% of the CO converted appeared as methane in the product. The remainder was mostly converted to $CO_2$.

EXAMPLE 2

In this example commercial $MoS_2$ is mixed with sulfur, reduced and evaluated.

This catalyst was prepared by mixing thoroughly 64 grams of the same commercial $MoS_2$ supplied by Alfa Products with 115 grams of sulfur (sublimed flowers of sulfur supplied by Amend Drug and Chemical Co.). This mixture was then heated in a partially covered procelain dish over a Bunsen burner to a boil to reduce the material to a thick, pasty residue. The residue was then calcined in a muffle oven for two hours at 450° C. The material was then removed and placed in a desiccator to cool to room temperature. The material was then prepared for reduction, reduced and prepared for evaluation using a similar procedure to that employed in Example 1.

The catalyst was evaluated using the same procedure as described in Example 1. In this case the feed gas composition was as follows:

|     | Vol. % |
| --- | --- |
| $H_2$ | 46.8 |
| CO | 36.4 |
| $CH_4$ | 16.8 |

In addition, the feed contained 2100 ppm $H_2S$.

At a temperature of 530° C. and a reactor pressure of 200 psig, the exit gas composition on a dry basis was as follows:

|     | Vol. % |
| --- | --- |
| $H_2$ | 40.5 |
| CO | 26.9 |
| $CH_4$ | 26.4 |
| $CO_2$ | 6.2 |

Calculations based on a carbon balance indicate that this corresponds to a CO conversion of 34% of the CO introduced to the reactor. Fifty-five percent (55%) of the CO converted appeared as methane, the remainder being mostly converted to $CO_2$. Small proportions of higher hydrocarbons were also produced.

EXAMPLE 3

In this example ammonium heptamolybdate is mixed with sulfur, reduced and evaluated.

This catalyst was prepared by mixing thoroughy 88 gm of $(NH_4)_2Mo_7O_{24}.4H_2O$ crystals reagent A.C.S. grade, supplied by Amend Drug and Chemical Co. with 176 grams of sulfur (sublimed flowers of sulfur supplied by Amend Drug and Chemical Co.). This mixture was heated to form a thick, pasty residue and calcined using the procedure described in Example 2. The material was then prepared for reduction, reduced and prepared for evaluation using the procedure employed in Example 1.

The procedure used in Example 1 was employed to evaluate this catalyst. Feed gas composition was as follows:

|     | Vol. % |
| --- | --- |
| $H_2$ | 46.5 |
| CO | 38.7 |
| $CH_4$ | 15.8 |

In addition, the feed contained 3500 ppm $H_2S$. At a temperature of 530° C. the exit gas composition on a dry basis was as follows:

|     | Vol. % |
| --- | --- |
| $H_2$ | 15.5 |
| CO | 16.5 |
| $CH_4$ | 51.9 |
| $CO_2$ | 16.1 |

Calculation based on a carbon balance corresponds to a conversion of 72% of the CO feed, 63% of which appears as methane in the product gas.

EXAMPLE 4

In this example molybdenum pentachloride is mixed with sulfur, reduced and evaluated.

This catalyst was prepared by mixing thoroughly 54.6 grams of $MoCl_5$ supplied by Alfa Products with 64 grams of sulfur (sublimed flowers of sulfur supplied by Amend Drug and Chemical Co.). This mixture was heated to form a thick, pasty residue, calcined, prepared for reduction, reduced, and prepared for evaluation using the procedure employed in Example 3.

The catalyst was evaluated as in Example 1, employing feed gas of the following composition:

|     | Vol. % |
| --- | --- |
| $H_2$ | 49.4 |
| CO | 35.5 |
| $CH_4$ | 15.1 |

The gas also contained 2400 ppm $H_2S$.

At a temperature of 530° C. and reactor pressure of 200 psig the exit gas composition on a dry basis was as follows:

|     | Vol. % |
| --- | --- |
| $H_2$ | 26.6 |
| CO | 20.1 |
| $CH_4$ | 41.2 |
| $CH_4$ | 41.2 |
| $CO_2$ | 12.1 |

This corresponds to a carbon monoxide conversion of 61%. Sixty-one and one-half percent (61.5%) of the CO converted appeared as methane in the product gas, the remaining carbon going mostly to $CO_2$, with small amounts of higher hydrocarbons also being produced.

EXAMPLE 5

A catalyst was prepared by dry-mixing thoroughly 109.2 grams of $MoCl_5$, 180 grams of sulfur and 36.3 grams of $ZrCl_4$ supplied by Alfa Products. This mixture was heated to form a thick, pasty residue, calcined, prepared for reduction, reduced, and prepared for evaluation using the procedure employed in Example 3.

The catalyst was evaluated using the procedure described in Example 1. The same gas feed composition was employed as in Example 4. At a temperature of 530° C. the exit gas composition on a dry basis was as follows:

|     | Vol. % |
| --- | --- |
| $H_2$ | 34.3 |
| CO | 15.8 |
| $CH_4$ | 37.2 |
| $CO_2$ | 12.7 |

This corresponds to a conversion of 65.7% of the CO present in the feed. Fifty-eight percent (58%) of the CO converted appeared as methane in the product. Most of the remaining carbon was converted to carbon dioxide, with a small proportion being converted to higher hydrocarbons.

EXAMPLE 6

In this example a molybdenum sulfide catalyst was produced by acidifying a solution of $(NH_4)_2MoS_4$ solution.

104 grams of $(NH_4)_2MoS_4$ was dissolved in 1600 ml of distilled water. This solution was acidified with diluted nitric acid (1:10) until the red color attributed to the thiomolybdate disappeared. The solution was then filtered and the precipitate washed first with distilled water and then with methanol and dried at 110° C. in a nitrogen atmosphere. The material was then prepared for reduction, reduced, and prepared for evaluation using the procedure employed in Example 3.

The catalyst was evaluated using the procedure described in Example 1. Feed gas composition was as follows:

|  | Vol. % |
|---|---|
| $H_2$ | 49.2 |
| CO | 34.5 |
| $CH_4$ | 16.3 |

The gas contained 2500 ppm $H_2S$.

At a temperature of approximately 530° C. and a pressure of 200 psig 50% of the CO feed was converted. Sixty-three percent (63%) of the CO converted appeared as methane in the product. The remainder went mostly to $CO_2$, with a small proportion of heavier hydrocarbons also being produced.

EXAMPLE 7

This example is taken from Example No. 4 of our previous patent, U.S. Pat. No. 4,320,030, to illustrate the results obtainable without sulfur addition during catalyst preparation.

EXAMPLE 8

In this example a molybdenum sulfide catalyst containing zirconium is prepared.

65 grams of $(NH_4)_2MoS_4$ was dissolved in 800 ml of distilled water. To this solution 0.1 gram atom of zirconium (Zr) was added as acidic zirconium nitrate solution containing 20% of $ZrO_2$. The black precipitate was filtered and washed first with distilled water and then methanol and dried at 110° C. in nitrogen atmosphere. The material was then prepared for reduction, reduced, and prepared for evaluation using the procedure employed in Example 3.

The catalyst was evaluated using the procedure described in Example 1. Feed gas composition was as follows:

|  | Vol. % |
|---|---|
| $H_2$ | 50.0 |
| CO | 34.5 |
| $CH_4$ | 15.5 |

To this gas was added 2500 ppm $H_2S$.

At a temperature of approximately 530° C. and a pressure of 200 psig the following gas composition on a dry basis was produced:

|  | Vol. % |
|---|---|
| $H_2$ | 33.3 |
| CO | 20.8 |
| $CH_4$ | 34.7 |
| $CO_2$ | 11.2 |

This corresponds to a conversion of 56% of the inlet CO feed gas, 59% of which appeared as methane in the product. The remainder of the carbon in the feed CO converted went to production of $CO_2$, with a small proportion of higher hydrocarbons.

EXAMPLE 9

In this example a molybdenum sulfide prepared by acidification of a $(NH_4)_2MoS_4$ solution is mixed with sulfur and evaluated.

57.6 grams of $MoS_3$ produced by the acidification of $(NH_4)_2MoS_4$ and using the procedure employed in Example 6 was mixed with 34.5 grams of sulfur and stirred in acetone. The mixture was then dried under a nitrogen atmosphere at 80° C. to a constant weight. The material was then prepared for reduction, reduced, and prepared for evaluation using the procedure employed in Example 3.

The same procedure for catalyst evaluation was used as in Example 1. The feed gas composition was as follows:

|  | Vol. % |
|---|---|
| $H_2$ | 58.7 |
| CO | 29.7 |
| $CH_4$ | 11.6 |

To this gas 1% volume of $H_2S$ was added.

The exit gas composition was as follows on a dry basis when operating at a temperature of 530° C. and a pressure of 200 psig:

|  | Vol. % |
|---|---|
| $H_2$ | 27.9 |
| CO | 16.3 |
| $CH_4$ | 41.4 |
| $CO_2$ | 14.4 |

This corresponds to a conversion of 69% of the entering CO, with 59% of that converted going to methane and the remainder mostly to $CO_2$, with a production of small amounts of higher hydrocarbons.

EXAMPLE 10

In this example ammonium thiomolybdate is mixed with sulfur and evaluated.

This catalyst was prepared by mixing thoroughly 78 grams of $(NH_4)_2MoS_4$ with 154 grams of sulfur. This mixture was then heated in a partially covered porcelain dish over a Bunsen burner boiling and reducing the material to a thick, pasty residue. The residue was then calcined in a muffle oven for 2 hours at 450° C. The material was then removed and placed in a desiccator to cool to room temperature. The material was then prepared for reduction, reduced and prepared for evaluation using the procedure employed in Example 1.

The catalyst was evaluated using the procedure employed in Example 1. The feed gas composition was as follows:

| | Vol. % |
|---|---|
| $H_2$ | 51.8 |
| CO | 33.9 |
| $CH_4$ | 14.3 |

To this gas was added 2500 ppm $H_2$.

The product gas on a dry basis obtained by conversion at 200 psig and at 530° C. was as follows:

| | Vol. % |
|---|---|
| $H_2$ | 13.9 |
| CO | 13.6 |
| $CH_4$ | 54.1 |
| $CO_2$ | 18.4 |

This corresponds to a conversion of 77.5% of that in the feed. The appearance of methane amounts to 61% of the CO that is converted. The CO not converted to methane is mostly converted to $CO_2$, with a small production of higher hydrocarbons.

EXAMPLE 11

In this example a molybdenum sulfide catalyst containing zirconium is prepared. This procedure differs from Example 8 in that all of the molybdenum is precipitated by adding additional nitric acid.

78 grams of $(NH_4)_2MoS_4$ was dissolved in 1200 ml of distilled water. To this solution 0.15 gram atom of Zr was added as 92.3 grams of acidic zirconium nitrate solution containing 20% $ZrO_2$. The solution was further acidified with diluted nitric acid until the red color attributed to the thiomolybdate disappeared, being careful not to remove any excess acidity. The precipitate was then filtered, washed first with distilled water and then acetone. Then 30 grams of sulfur stirred in acetone was added to the acetone-wet filter cake. The excess acetone was removed and the resultant cake was dried in an oven under nitrogen atmosphere at 80° C. to a constant weight. Then the dried mixture is prepared for reduction, reduced, prepared for evaluation using the procedure employed in Example 3.

The catalyst was evaluated as in Example 1. A feed gas of the following composition was employed:

| | Vol. % |
|---|---|
| $H_2$ | 54.1 |
| CO | 32.2 |
| $CH_4$ | 13.7 |

To this gas was added 1 vol.% of $H_2S$.

The product gas corrresponding to a temperature of about 530° C. and a pressure of 200 psig was as follows on a dry basis:

| | Vol. % |
|---|---|
| $H_2$ | 23.8 |
| CO | 11.9 |
| $CH_4$ | 45.7 |
| $CO_2$ | 18.6 |

This is equivalent to a conversion of 78% of the CO in the feed gas stream, with 55% of the converted CO going to methane. The remainder goes mostly to $CO_2$, with a small production of higher hydrocarbons.

EXAMPLE 12

This example is similar to Example 8 except that in this case sulfur was added.

The black precipitate was prepared using the same procedure employed in Example 8. The precipitate was filtered and washed first with distilled water and then with methanol and dried at 80° C. in an oven under a nitrogen atmosphere. The dried precipitate was then thoroughly mixed with 130 grams of sulfur. The material was then heated in a partially covered porcelain dish over a Bunsen burner boiling and reducing the material into a thick, pasty residue. The material was then calcined, prepared for reduction, reduced and prepared for evaluation using the procedure employed in Example 3.

As in Example 1, 5 cc of this catalyst was charged to a catalyst evaluation reactor and a gas flow rate composition, the same as in that example, were employed. Pressure was maintained at 200 psig and a space velocity of inlet gas of 4800 v/v/hr was used. However, instead of raising the bed temperature to 530° C., it was raised rapidly to 700° C. and maintained at this temperature. At this high temperature the conversion dropped during the first 15 hours from an initial activity of 65% CO conversion to a conversion of 45%. During this period 60% of the CO converted appeared as methane in the effluent gas. The test was continued for 24 hours and during the last 9 hours of operation no further change in activity occurred. In the case of catalysts in which stabilizers such as zirconium were not added to the formation, much more rapid decline in activity occurred and the catalyst activity continued to decline during extended operation at 700° C.

EXAMPLE 13

A catalyst was prepared in which tantalum was employed as the stabilizing element instead of zirconium.

Sixty-five grams of $(NH_4)_2MoS_4$ were dissolved in 1000 ml of distilled water. To this solution 0.1027 gram atom of Ta in the form of an acidic tantalum oxalate solution was added containing 1 pound of $Ta_2O_5$ in 2 liters of solution supplied by Kawecki Berylco Industries. The resultant precipitate was filtered, washed with distilled water and then with methanol and dried in an oven at 80° C. under a nitrogen atmosphere. The dried material was then thoroughly mixed with 120 grams of sulfur. The material was then boiled reducing its mass to a thick, pasty residue, calcined, prepared for reduction, reduced, and prepared for evaluation using the procedure employed in Example 12.

Using the same procedure as in Example 1, 5 cc of this catalyst was charged into the catalyst evaluation reactor. The same standard operating conditions, gas feed composition and flow rate were employed. At a temperature of 530° C., a conversion of the CO in the feed of 51% was obtained, 60% of which was converted to methane. After operation for several hours at 530° C., the reactor temperature was reduced to 485° C. The conversion remained the same at this lower temperature, indicating that tantalum addition can be useful for improvement of low temperature stability.

EXAMPLE 14

A catalyst was prepared in which niobium was employed as the stabilizing element.

There was dissolved 52.0 grams $(NH_4)_2MoS_4$ in 300 ml of distilled water. To this solution 49.0 grams of Niobium Oxalate supplied by Kawecki Berlco Industries and 38 grams of NH₄CNS was added. This mixture was heated to a boil in a partially covered porcelain dish. When the mixture started boiling, 24 grams of sulfur (sublimed sulfur flowers) and 3 grams of activated cocoanut charcoal were added and thoroughly mixed. The material was heated, reducing it to a thick, pasty residue. The material was then placed in a desiccator to cool to room temperature. The material was then prepared for reduction, reduced, and prepared for evaluation, using the procedure that was employed in Example 2.

The same procedure was employed to test this catalyst as in Example 1, using the same operating conditions and gas feed composition. At a temperature of 530° C., a conversion of the CO in the feed of 48% was obtained, 58% of which was converted to methane.

EXAMPLE 15

A catalyst was prepared in which vanadium was employed instead of molybdenum, without adding any stabilizing element to the formulation.

Seventy (70) grams of oxalic acid were dissolved in 200 ml of distilled water. To this solution, 35.1 grams of NH₄VO₃ supplied by J. J. Baker Chemical Co. were added and heated to completely dissolve all of the solids. To this solution 114 grams of NH₄CNS dissolved in 150 ml of water were added and mixed. This mixture was then heated to boiling in a partially covered porcelain dish. When the mixture started to boil, 24 grams of sulfur and 3 grams of activated cocoanut charcoal were added and thoroughly mixed. This material was then heated, reducing it to a thick, pasty residue. The material was then placed in a desiccator to cool to room temperature. The material was then prepared for reduction, reduced, and prepared for evaluation using the procedure that was employed in Example 14.

Using the same procedure as in Example 1, 5 cc of this catalyst was charged to the catalyst reactor and evaluated, using the standard test procedure as in that example. A conversion of CO of 13% was obtained, 50% of which appeared as methane in the product. The relatively low activity is due to the fact that the catalyst was very pyrophoric, so that it was partially oxidized in the course of pelletizing and introduction into the reactor. The fact that 50% of the CO converted went to methane is of interest since it indicates that practically no water was produced, with the oxygen being removed as $CO_2$.

We claim:

1. A method of making a catalyst comprising forming an intimate mixture of one or more sulfides of one or more of the elements selected from the group consisting of vanadium, molybdenum and tungsten with elemental sulfur, heating the mixture to a temperature in excess of 200° C., contacting the mixture with hydrogen and hydrogen sulfide to produce an exotherm, cooling the resulting mixture and forming it into a catalyst.

2. A method as in claim 1 which comprises including in the mixture one or more stability enhancing elements selected from the group consisting of C, Si, B, Ce, Th, Nb, Zr, Ta and U.

3. A method as in claim 2 which comprises including in the mixture one or more promoter elements selected from the group consisting of Co, Ni and Fe.

4. A method as in claim 3 in which said heating comprises heating the mixture to a temperature in the range of about 400° to 600° C.

5. A method as in claim 3 in which said heating comprises heating the mixture to a temperature of about 450°–500° C.

6. A method as in claim 3 in which the mixture comprises sulfur in the range of 1–99 wt. % of the one or more sulfides selected from said group.

7. A method as in claim 3 which the mixture comprises sulfur in the range of 20–60 wt. % of the one or more sulfides selected from said group.

8. A method as in claim 3 in which said forming of an intimate mixture comprises forming a mixture of solid materials.

9. A method as in claim 1 which comprises including in the mixture one or more promoter elements selected from the group consising of Co, Ni and Fe.

10. A method as in claim 1 in which said heating comprises heating the mixture to a temperature in the range of about 400°–600° C.

11. A method as in claim 1 in which said heating comprises heating the mixture to a temperature of about 450°–500° C.

12. A method as in claim 1 in which the mixture comprises sulffur in the range of 1–99 wt. % of one or more sulfides selected from said group.

13. A method as in claim 1 in which the mixture comprises sulfur in the range of 20–60 wt. % of the one or more sulfides selected from said group.

14. A method as in claim 1 in which said forming of an intimate mixture comprises forming a mixture of solid materials.

* * * * *